US012429284B2

(12) United States Patent
Ganguly et al.

(10) Patent No.: US 12,429,284 B2
(45) Date of Patent: Sep. 30, 2025

(54) BULK FREEZE DRYING SYSTEM

(71) Applicant: IMA LIFE NORTH AMERICA INC., Tonawanda, NY (US)

(72) Inventors: Arnab Ganguly, Williamsville, NY (US); Francis W. Demarco, Niagara Falls, NY (US); Ernesto Renzi, Youngstown, NY (US)

(73) Assignee: IMA LIFE NORTH AMERICA INC., Tonawanda, NY (US)

( * ) Notice: Subject to any disclaimer, the term of this patent is extended or adjusted under 35 U.S.C. 154(b) by 961 days.

(21) Appl. No.: 17/283,077

(22) PCT Filed: Oct. 11, 2018

(86) PCT No.: PCT/US2018/055430
§ 371 (c)(1),
(2) Date: Apr. 6, 2021

(87) PCT Pub. No.: WO2020/076328
PCT Pub. Date: Apr. 16, 2020

(65) Prior Publication Data
US 2021/0381766 A1 Dec. 9, 2021

(51) Int. Cl.
*F26B 5/06* (2006.01)
*F26B 17/12* (2006.01)
*F26B 17/00* (2006.01)

(52) U.S. Cl.
CPC .............. *F26B 5/065* (2013.01); *F26B 17/12* (2013.01); *F26B 17/006* (2013.01)

(58) Field of Classification Search
CPC ........................................................ B01D 7/02
See application file for complete search history.

(56) References Cited

U.S. PATENT DOCUMENTS 2,535,109 A 12/1950 Wigton
3,058,235 A 10/1962 Morris et al.
(Continued)

FOREIGN PATENT DOCUMENTS

EP 1267138 A1 12/2002
EP 2270409 A1 1/2011
(Continued)

OTHER PUBLICATIONS

International Search Report, International Application No. PCT/US2018/055430, dated Aug. 12, 2019, pp. 1-8, EP Search Authority.
(Continued)

*Primary Examiner* — Jason Lau
(74) *Attorney, Agent, or Firm* — Luccarelli & Musacchio LLP; Pasquale Musacchio

(57) ABSTRACT

A freeze drying system (200) having a nozzle (30) operated at a setpoint pressure to generate fluid product drops (242) for freezing in a freezing chamber (244) of a freezing vessel (228). The freezing chamber includes an inner wall (250) that defines a cavity (254) and an outer wall (252) having an inlet (260) that extends from a location on the outer wall that is lower than an outlet (262). A cooling fluid flows through the inlet, cavity and outlet to form a freezing zone (280). A drying chamber (304) having sloped shelves (352) receives frozen particles (282) from the freezing chamber. A heating element (418) is associated with each shelf that heats the frozen particles to promote sublimation. Vibration elements (396, 398, 400, 402) located outside the drying chamber vibrate the shelves causing the frozen particles to move from shelf to shelf to form freeze dried product (284).

13 Claims, 7 Drawing Sheets

(56) References Cited

U.S. PATENT DOCUMENTS

| | | | | |
|---|---|---|---|---|
| 3,749,378 | A | 7/1973 | Rhodes | |
| 3,788,095 | A | 1/1974 | Murphy, Jr. et al. | |
| 5,022,265 | A | 6/1991 | Voss | |
| 5,216,890 | A * | 6/1993 | Ban | B01D 7/02 62/304 |
| 5,732,688 | A * | 3/1998 | Charlton | F02M 26/32 123/568.12 |
| 2005/0144804 | A1 | 7/2005 | Alstat | |
| 2006/0138687 | A1* | 6/2006 | Shekunov | A61K 9/1688 424/491 |
| 2008/0075777 | A1 | 3/2008 | Kennedy | |
| 2018/0327478 | A1* | 11/2018 | Olbrich | C07K 14/755 |

FOREIGN PATENT DOCUMENTS

| | | | |
|---|---|---|---|
| EP | 2320184 | A1 | 5/2011 |
| EP | 2764311 | B1 | 11/2015 |
| EP | 2764308 | B1 | 9/2016 |
| EP | 2764309 | B1 | 11/2016 |
| EP | 2764310 | B1 | 11/2016 |
| EP | 2766682 | B1 | 11/2016 |
| GB | 948517 | A | 2/1964 |
| GB | 1032857 | A | 6/1966 |
| WO | 2005047791 | A2 | 5/2005 |
| WO | 2005061088 | A1 | 7/2005 |
| WO | 2016196110 | A1 | 12/2016 |

OTHER PUBLICATIONS

Written Opinion, International Application No. PCT/US2018/055430, dated Aug. 12, 2019, pp. 1-12, EP Search Authority.

International Search Report, International Application No. PCT/US2019/053949, dated Nov. 18, 2019, pp. 1-4, EP Search Authority.

International Search Report, International Application No. PCT/US2018/055455, dated Dec. 5, 2018, pp. 1-3, EP Search Authority.

EP Search Report, EP Application No. 19163600.0-1009, dated May 14, 2019, pp. 1-9, EP Search Authority.

Written Opinion of the International Search Authority, International Application No. PCT/US2019/053949, dated Nov. 18, 2019, pp. 1-8, EP Search Authority.

* cited by examiner

BULK FREEZE DRYING SYSTEM

FIELD OF THE INVENTION

The present disclosure generally relates to a bulk freeze drying system, and more particularly, to bulk freeze drying system having a nozzle operated at a setpoint nozzle pressure to generate fluid product drops suitable for freezing in a freezing chamber of a freezing vessel having inner and outer walls wherein the inner wall forms a cavity and the outer wall includes a cavity inlet that extends from a location on the outer wall that is lower than a cavity outlet wherein a cooling fluid flows through the cavity inlet, cavity and cavity outlet to form a freezing zone and wherein the bulk freeze drying system further includes a drying chamber having a plurality of sloped shelves that receive frozen particles from the freezing chamber wherein a heating element is associated with each shelf that heats the frozen particles to promote sublimation and wherein a plurality of vibration elements located outside the drying chamber vibrate the shelves in a horizontal direction to cause the frozen particles to advance relative to an associated shelf and move from shelf to shelf to form freeze dried product in powder form.

BACKGROUND

Freeze drying is a process that removes a solvent or suspension medium, typically water, from a product. While the present disclosure uses water as the exemplary solvent, other solvents, such as alcohol, may also be removed in freeze drying processes and may be removed with the presently disclosed methods and apparatus.

In a freeze drying process for removing water, the water in the product is frozen to form ice and, under vacuum, the ice is sublimed and the vapor flows to a condenser. The water vapor is condensed on the condenser as ice and is later removed from the condenser. Freeze drying is particularly useful in the pharmaceutical industry, as the integrity of the product is preserved during the freeze drying process and product stability can be guaranteed over relatively long periods of time. The freeze dried product is ordinarily, but not necessarily, a biological substance.

Pharmaceutical freeze drying is often an aseptic process that requires sterile conditions within the freezing and drying chambers. It is critical to assure that all components of the freeze drying system coming into contact with the product are sterile.

Freeze drying of bulk product in aseptic conditions may be performed in a freeze dryer wherein the bulk product is placed in trays. In one example of a conventional freeze drying system 100 shown in FIG. 1, a batch of product 112 is placed in freeze dryer trays 121 within a freeze drying chamber 110. Freeze dryer shelves 123 are used to support the trays 121 and to transfer heat to and from the trays and the product as required by the process. A heat transfer fluid flowing through conduits within the shelves 123 may be used to remove or add heat.

Under vacuum, the frozen product 112 is heated slightly to cause sublimation of the ice within the product. Water vapor resulting from the sublimation of the ice flows through a passageway 115 into a condensing chamber 120 containing condensing coils or other surfaces 122 maintained below the condensation temperature of the water vapor. A coolant is passed through the coils 122 to remove heat, causing the water vapor to condense as ice on the coils.

Both the freeze drying chamber 110 and the condensing chamber 120 are maintained under vacuum during the process by a vacuum pump 150 connected to the exhaust of the condensing chamber 120. Non-condensable gases contained in the chambers 110, 120 are removed by the vacuum pump 150 and exhausted at a higher pressure outlet 152.

Tray dryers are typically designed for aseptic vial drying and are not optimized to handle bulk product. Bulk product must be manually loaded into the trays, freeze dried, and then manually removed from the trays. Handling the trays is difficult, and creates the risk of a liquid spill. Heat transfer resistances between the product and the trays, and between the trays and the shelves, sometimes causes irregular heat transfer. Dried product must be removed from trays after processing, resulting in product handling loss.

Because the process is performed on a large mass of product, agglomeration into a “cake” often occurs, and milling is required to achieve a suitable powder and uniform particle size. Cycle times may be longer than necessary due to resistance of the large mass of product to heating and the poor heat transfer characteristics between the trays, the product and the shelves.

Various alternatives to tray dryers have been tried, often involving metal-to-metal moving contact within the vacuum dryers. Those arrangements present problems in aseptic applications because metal-to-metal moving contact such as sliding or rolling produces small metal particles that cannot be easily sterilized, and because moving mechanical elements such as bearings and bushings have hidden surfaces and are difficult to sterilize.

Spray freezing has been used as a technique for creating a particulate frozen bulk product. Issues with current systems include control of the particle size in the frozen bulk product and the efficient removal of heat from the sprayed drops.

SUMMARY

A nozzle system is disclosed for a freeze drying system having a freezing vessel that includes a freezing chamber. The nozzle system includes a product vessel having a product reservoir that receives fluid product, wherein the fluid product defines a liquid level suitable for operating the nozzle system. The nozzle system also includes at least one nozzle that extends into the freezing chamber, wherein the nozzle is connected to the product reservoir by a first fluid passageway to enable a flow of fluid product to the nozzle. The nozzle is operated at a setpoint nozzle pressure to generate fluid product drops having a size suitable for freeze drying. An adjusting fluid source is connected to the product reservoir by a second fluid passageway to enable the injection of an adjusting fluid into the product reservoir. The second fluid passageway includes a valve that controls an adjusting fluid flow rate into the product reservoir wherein the adjusting fluid flow rate is adjusted to increase pressure within the product reservoir to provide a backing pressure that compensates for changes in the liquid level that occur during operation of the nozzle to maintain the setpoint nozzle pressure.

In addition, a freezing vessel is disclosed for a freeze drying system that forms freeze dried product in powder form. The freezing vessel includes an inner circumferential wall defining a freezing chamber and a top wall including at least one nozzle having a nozzle outlet end that sprays fluid product drops that flow downward into the freezing chamber. The freezing vessel also includes an outer circumferential wall spaced apart from the inner circumferential wall to form a cavity between the inner and outer walls wherein a lower end of the inner wall defines a freezing chamber outlet. A cavity outlet extends from the outer wall, wherein the cavity outlet is in fluid communication with the cavity. A cavity inlet extends from a location on the outer wall that is lower than a location of the cavity outlet, wherein the cavity inlet is in fluid communication with the cavity. A cooling fluid enters the cavity through the cavity inlet and flows through the cavity at a first flow rate and is discharged from the cavity through the cavity outlet to form a freezing zone having a freezing zone temperature between the cavity inlet and the cavity outlet. The fluid product drops freeze in the freezing zone and form frozen product particles that exit the freezing chamber outlet. The freezing vessel further includes a temperature sensor that detects an outlet temperature of the cooling fluid discharged at the cavity outlet, wherein the outlet temperature is indicative of the freezing zone temperature. The first flow rate of the cooling fluid is adjusted to increase or decrease the freezing zone temperature to obtain a setpoint temperature detected by the temperature sensor to maintain a freezing zone temperature suitable for forming the frozen product particles.

Those skilled in the art may apply the respective features of the present invention jointly or severally in any combination or sub-combination.

BRIEF DESCRIPTION OF DRAWINGS

The exemplary embodiments of the invention are further described in the following detailed description in conjunction with the accompanying drawings, in which.

DESCRIPTION

Figure 1:
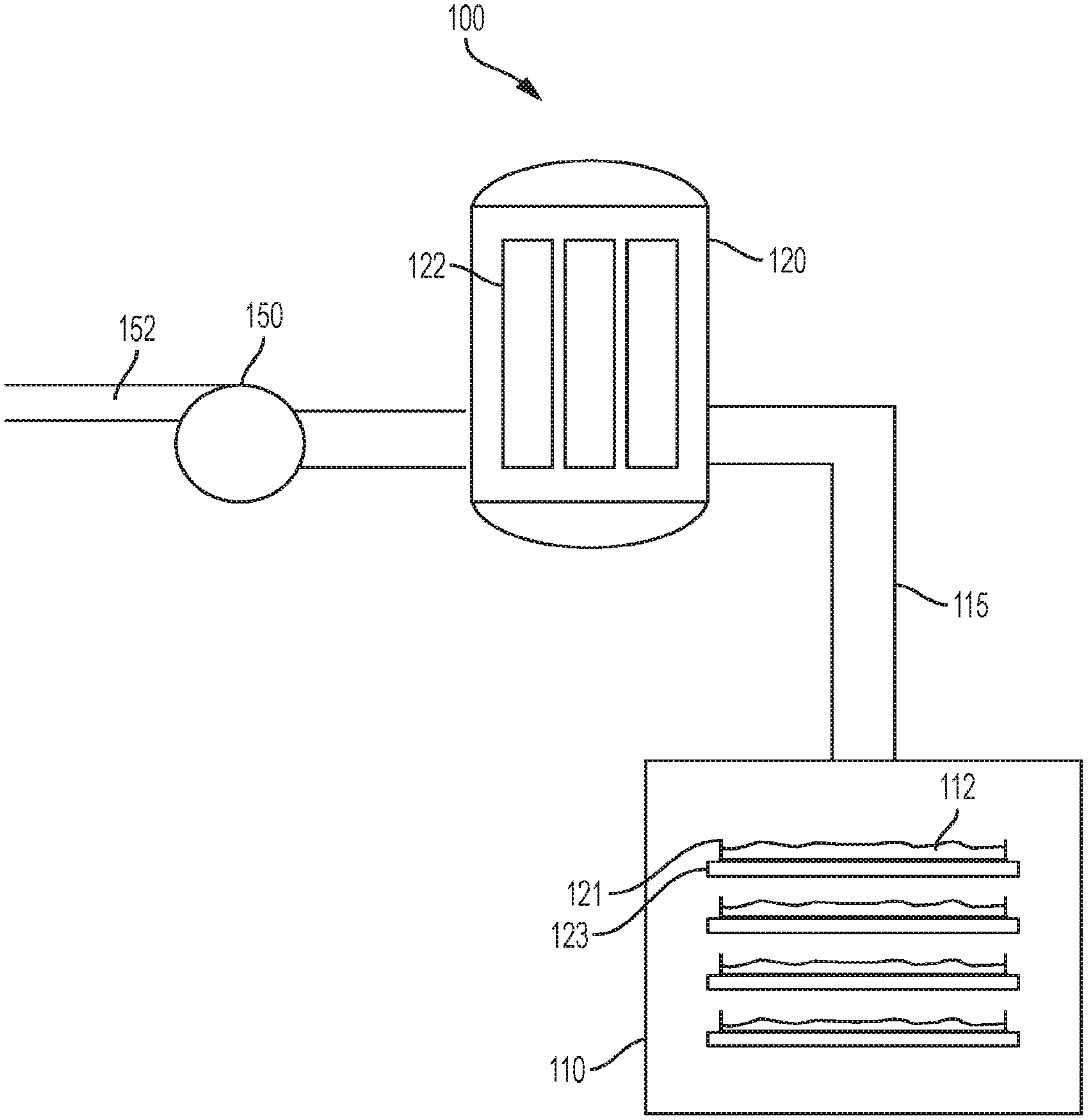
FIG. 1 PRIOR ART
FIG. 1 depicts a conventional freeze drying system.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

In an aspect of the present disclosure, systems and methods are described for freeze drying an aseptic bulk fluid product in an efficient manner, without compromising the aseptic qualities of the product while also increasing product yield. In addition, the systems and methods of the present disclosure are directed to optimized bulk freeze drying that provides dry product in a powder form.

The processes and apparatus may be advantageously used in drying bulk fluid pharmaceutical products that require aseptic or sterile processing, such as injectables. In this regard, it is important that all components of a freeze drying system coming into contact with the product are sterile. The methods and apparatus may also be used, however, in processing materials that do not require aseptic processing, but require moisture removal while preserving structure, and require that the resulting dried product be in powder form. For example, ceramic/metallic products used as superconductors or for forming nanoparticles or microcircuit heat sinks may be produced using the disclosed techniques.

The methods described herein may be performed in part by at least one industrial controller and/or computer used in conjunction with the processing equipment described below. In an embodiment, bulk freeze drying system 200 (FIG. 2) includes controllers 205A and 205B that control opening and closing of valves 222, 236, 270, 336, 338 and 210, 310, 312 314, 316, respectively. The equipment is controlled by a programmable logic controller (PLC) that has operating logic for valves, motors, etc. An interface with the PLC is provided via a personal computer (PC). The PC loads a user-defined recipe or program to the PLC to run. The PLC will upload to the PC historical data from the run for storage. The PC may also be used for manually controlling the devices, operating specific steps such as freezing, defrost, steam in place, etc.

The PLC and the PC include central processing units (CPU) and memory, as well as input/output interfaces connected to the CPU via a bus. The PLC is connected to the processing equipment via the input/output interfaces to receive data from sensors monitoring various conditions of the equipment such as temperature, position, speed, flow, etc. The PLC is also connected to operate devices that are part of the equipment.

The memory may include random access memory (RAM) and read-only memory (ROM). The memory may also include removable media such as a disk drive, tape drive, etc., or a combination thereof. The RAM may function as a data memory that stores data used during execution of programs in the CPU, and is used as a work area. The ROM may function as a program memory for storing a program including the steps executed in the CPU. The program may reside on the ROM, and may be stored on the removable media or on any other non-volatile computer-usable medium in the PLC or the PC, as computer readable instructions stored thereon for execution by the CPU or other processor to perform the methods disclosed herein.

Figure 2:
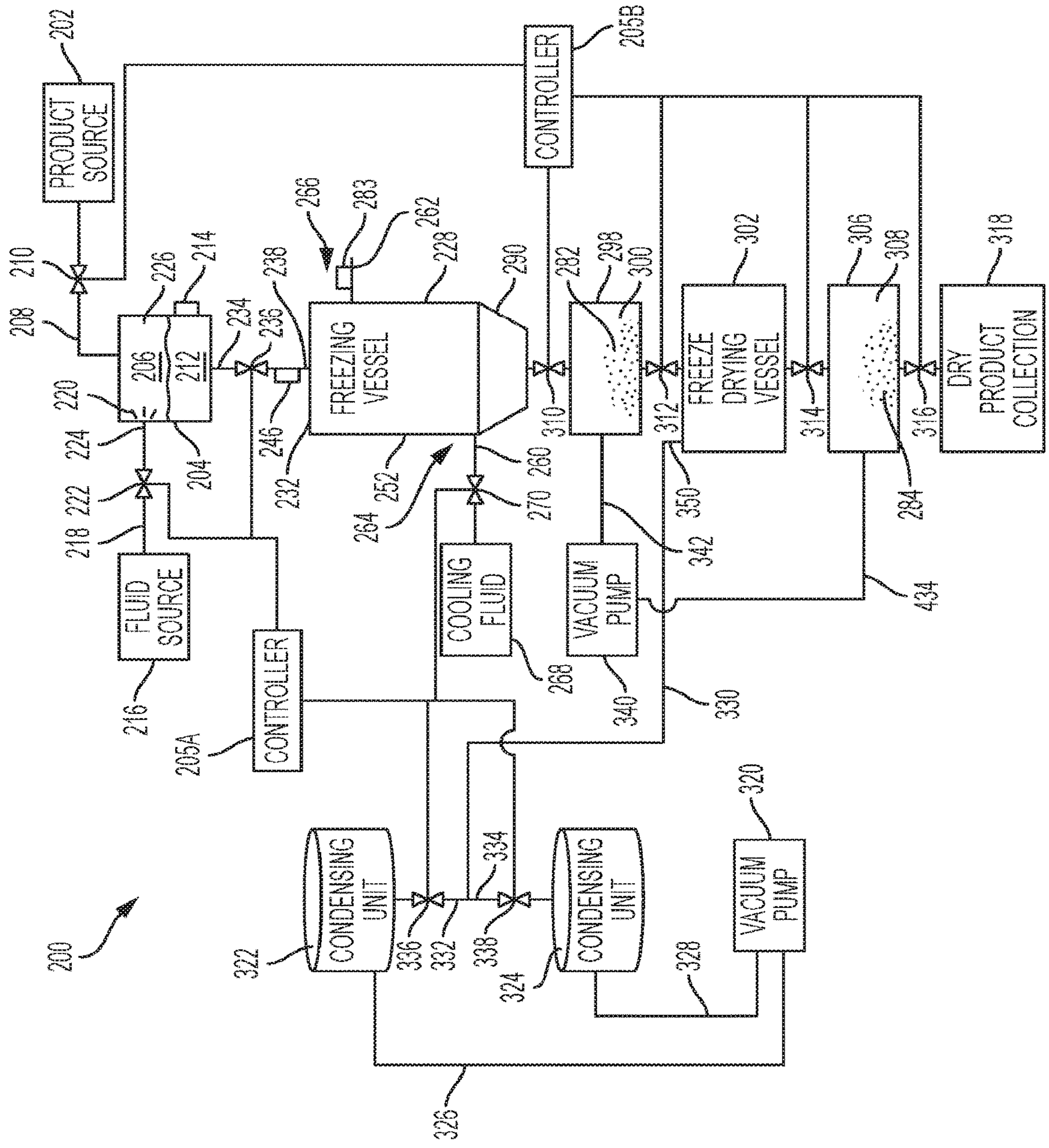
FIG. 2 is a schematic view of a bulk freeze drying system in accordance an aspect of the invention.

A bulk freeze drying system 200 in accordance an aspect of the invention is shown in FIG. 2. The system 200 includes a source of bulk fluid product 202, such as a liquid product, and a product vessel 204 having a product reservoir 206. The product source 202 and product reservoir 206 are connected by a fluid passageway or conduit 208 that provides fluid communication between the product source 202 and product reservoir 206. The conduit 208 includes a valve 210 that controls a flow of fluid product 212, such as liquid product, into the product reservoir 206. The product vessel 204 also includes a first pressure sensor 214 that measures a static pressure head of product 212 formed when product 212 is introduced into the product reservoir 206. In an embodiment, the first pressure sensor 214 may be a differential pressure transducer (DPT) that provides liquid level readings of product 212 in the product reservoir 206 based on a change in reservoir pressure in the product reservoir 206. The product reservoir 206 may be partially or completely filled with product 212 until a predetermined liquid level of product 212 suitable for operating a nozzle 230 is detected by the first pressure sensor 214. It understood that other devices or sensors may be used to determine the amount or level of product 212 in the product reservoir 206. The product reservoir 206 is also in fluid communication with a sterile adjusting fluid source 216 such as a nitrogen gas ($N_2$) source through a fluid conduit 218 connected between the fluid source 216 and the product reservoir 206 to enable the injection of a fluid such as a sterile gas 220 into the product reservoir 206. Fluid conduit 218 includes valve 222 that controls gas flow into the product reservoir 206. In an embodiment, an outlet 224 of fluid conduit 218 is located such that the gas 220 is injected into an empty portion 226 of a partially filled product reservoir 206.

The system 200 also includes a freezing vessel 228 having at least one substantially vertical nozzle 230 (see FIG. 3A) that extends through a top wall 232 of the freezing vessel 228. The freezing vessel 228 and nozzle 230 are located underneath the product reservoir 206. A fluid conduit 234 including valve 236 is connected between the product reservoir 206 and an inlet end 238 of the nozzle 230. When valve 236 is opened, product 212 flows downward by gravity from the product reservoir 206 through the valve 236 and into the nozzle inlet end 238. The product 212 is then sprayed from an outlet end 240 of the nozzle 230 in the form of uniform successive drops 242 that flow downward into a freezing chamber 244 (see FIG. 3A) of the freezing vessel 228 as will be described. In an embodiment, the nozzle may be fabricated from sapphire and includes a piezoelectric actuator 235 configured to produce drops such as nozzles available from Disco Engineering AG, Zurich, Switzerland.

It is important to control the size of the drops 242, for example, a diameter of the drops 242, when the product 212 is sprayed. In accordance with an aspect of the invention, drop size is dependent upon at least three operational parameters of the nozzle 230. The parameters include a pressure at which the product 212 is provided to the nozzle 230 (i.e. nozzle pressure) and a frequency and amplitude of the signal used to energize the piezoelectric actuator of the nozzle 230. It has been determined by the inventors herein that a predetermined constant nozzle pressure (i.e. a setpoint pressure) should be maintained for the nozzle 230 in order to generate a plurality of successive drops 242 having a desired substantially uniform size. In an embodiment, each drop has a diameter of approximately 1 mm. The nozzle pressure is detected by a second pressure sensor 246 located between the product reservoir 206 and nozzle 230.

During spraying of product 212, product 212 in the product reservoir 206 is consumed and the liquid level of product 212 in the product reservoir 206 decreases, thus decreasing the nozzle pressure below the setpoint pressure. In accordance with an aspect of the invention, sterile gas 220 from the fluid source 216 is then injected into the product reservoir 206 at a suitable gas flow rate. The gas 220 urges against the product 212 thus increasing pressure within the product reservoir 206 and providing a backing pressure. The increase in pressure compensates for the decrease in the liquid level of product 212 and thus maintains the setpoint pressure for the nozzle 230. The gas flow rate for gas 220 injected into product reservoir 206 is controlled or modulated by valve 222 to provide a suitable pressure increase within the product reservoir 206 that achieves the setpoint pressure. The gas flow rate may be increased as needed in order to compensate for further decreases in the liquid level of product 212 and maintain the setpoint pressure for the nozzle 230. Alternatively, the gas flow rate may be decreased as needed, to maintain the setpoint pressure, in order to compensate for increases in the liquid level of product 212 that may occur when product 212 is added to the product reservoir 206. Thus, the pressure sensor 246 provides feedback information used to increase or decrease the gas flow rate for gas 220 injected into the product reservoir 206. In addition, a vibration damping material 237 may be used to isolate the nozzle 230 from ambient vibrations and/or vibrations generated by vibration elements 396, 398, 400, 402 (see FIG. 4) so that a desirable drop uniformity is maintained. In an embodiment, the vibration damping material 237 may be a known vibration damping material or a flexible arrangement may be used such as a flexible sanitary flange.

Figure 3B:
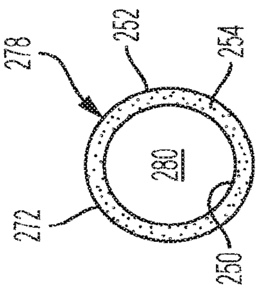
FIGS. 3A and 3B are side and top views, respectively, of an interior of a freezing vessel in accordance with an aspect of the invention.
Figure 3A:
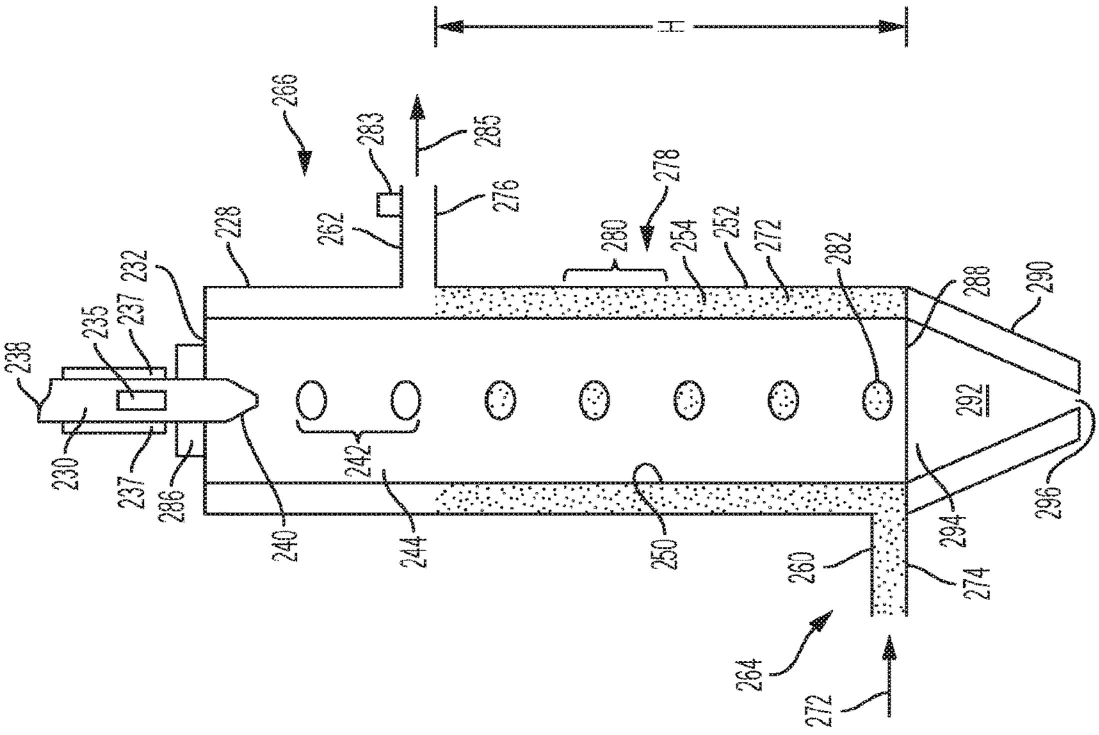

Referring to FIGS. 3A and 3B, side and top views, respectively, of an interior of the freezing vessel 228 are shown. The freezing vessel 228 includes an inner circumferential wall 250 that defines the freezing chamber 244. The nozzle outlet end 240 is located in a top portion of the freezing chamber 244 and sprays product 212 in the form of uniform successive drops 242 that flow downward into the freezing chamber 244. The freezing vessel 228 also includes an outer circumferential wall 252 that is spaced apart from the inner wall 250 to form an empty cavity 254 between the inner 250 and outer 252 walls having a substantially annular shape. It is understood that the inner 250 and outer 252 walls and cavity 254 may have other shapes such as oval, arcuate and others. The freezing vessel 228 further includes cavity inlet 260 and outlet 262 conduits that extend from a bottom portion 264 and an upper portion 266 of the outer wall 252, respectively, of the freezing vessel 228. The cavity inlet 260 connects a source 268 of a cooling fluid such as liquid nitrogen ($LN_2$) to the cavity 254 to provide fluid communication between the $LN_2$ source 268 and the cavity 254. The cavity inlet 260 includes a valve 270 (FIG. 2) that controls a flow of $LN_2$ 272 into the cavity 254. The cavity outlet 262 is also in fluid communication with the cavity 254. As will be described, the $LN_2$ 272 is used to remove heat from a freezing zone 280 in the freezing chamber 274 in order to lower temperature. In this embodiment, the $LN_2$ 272 is in direct contact with the inner wall 250 as the $LN_2$ 272 flows through the cavity 254 to remove heat. The heat is absorbed by the $LN_2$ 272 causing evaporation of a portion of the $LN_2$ flowing through the cavity 254 resulting in the discharge of two phase flow 285 including $N_2$ and $LN_2$ (i.e. combined $N_2/LN_2$ flow 285) from the cavity 254 via the cavity outlet 262. In an embodiment, the cavity inlet 260 is located such that $LN_2$ enters the cavity 254 at a location lower than the location from which the combined $N_2/LN_2$ flow 285 is discharged from the cavity 254 through the cavity outlet 262.

In use, $LN_2$ 272 flows from the $LN_2$ supply 268, through the cavity inlet 260, valve 270, enters a lower portion of the cavity 254, rises upward through the cavity 254 and the combined $N_2/LN_2$ flow 285 is discharged from an upper portion of the cavity 254 through the cavity outlet 262. Thus, the $LN_2$ 272 rises to a height H in the cavity 54 corresponding to the vertical distance between an inlet bottom portion 274 of the cavity inlet 260 and an outlet bottom portion 276 of cavity outlet 262. This forms an $LN_2$ jacket 278 that surrounds a portion of the freezing chamber 244. The $LN_2$ 272 within the cavity 254 lowers the temperature of a corresponding portion of the freezing chamber 244 to form a freezing zone 280 having a freezing zone temperature and a freezing zone height that equals the height H (i.e. height H of freezing zone 280). As previously described, product 212 is sprayed from the nozzle outlet end 240 in the form of uniform successive drops 242 that flow downward into the freezing chamber 244. In accordance with an aspect of the invention, the distance that the drops 242 travel downward through the freezing zone 280 (i.e. the height H) provides a sufficient amount of time for the drops 242 to freeze to form particles of frozen product 282 (i.e. frozen particles 282) when exposed to the freezing zone temperature. In an embodiment, the temperature of the freezing zone 280 is approximately −150 to −185 degrees C. In this embodiment, a freezing zone 280 having a freezing zone temperature sufficient to form the frozen particles 282 is formed without tubes, conduits, piping, baffles, valves or other stricture or devices being located in the cavity 254 that would enable or assist in forming the freezing zone 280.

A temperature sensor 283, such as a resistance temperature detector (RTD), is located at the cavity outlet 262 and monitors the temperature of the combined $N_2/LN_2$ flow 285 discharged from the cavity outlet 262 (i.e. $N_2/LN_2$ flow discharge temperature). The $N_2/LN_2$ flow discharge temperature is indicative of the freezing zone temperature of the freezing zone 280. In accordance with an aspect of the invention, a setpoint temperature for the $N_2/LN_2$ flow discharge temperature is determined that is indicative of the freezing zone temperature. The freezing zone temperature may be adjusted or regulated by increasing or decreasing the flow of $LN_2$ 272 through the cavity 254. In particular, increasing $LN_2$ flow removes additional heat from the freezing zone 280, thus lowering the freezing zone temperature. Conversely, decreasing $LN_2$ flow through the cavity 254 removes less heat from the freezing zone 280, thus increasing the freezing zone temperature. The $LN_2$ flow rate through the cavity 254 may be adjusted by controlling valve 270. The nozzle outlet end 240 is located a sufficient distance from the freezing zone 280 to ensure that operation of the nozzle 230 is not affected by the cold temperature of the freezing zone 280. In an embodiment, the nozzle 230 may also include a nozzle heating element 286, such as an electric heater, to heat the nozzle 230 and maintain the nozzle 230 at a suitable operating temperature.

The height H of the freezing zone 280 is selected based upon the freezing temperature of the product being sprayed and the volume of the drops. In order to accommodate products 212 having different freezing temperatures and drop volumes, the height H of the freezing zone 280 may be increased or decreased by moving either the cavity inlet 260 or the cavity outlet 262, or moving both the cavity inlet 260 and the cavity outlet 262, relative to the outer wall 252. In an embodiment, the cavity inlet 260 may be moved vertically upward relative to the outer wall 252 to decrease the height H of freezing zone 280. In particular, movement of the cavity inlet 260 upward in order to decrease the height H enables freezing of the drops 242 to occur closer to the nozzle outlet end 240 than would occur by moving the cavity outlet 262 downward to decrease the height H. The outer wall 252 may include more than one attachment point for attaching either the cavity inlet 260 or cavity outlet 262, or both, in different vertical positions on the outer wall 252 in order to move the cavity inlet 260 or cavity outlet 262, or both, to change the height H. Alternatively, a vertically moveable attachment point may be used for connection to either the cavity inlet 260 or cavity outlet 262, or both, in order to change the height H.

After the frozen particles 282 pass through the freezing zone 280, the frozen particles 282 flow downward through a freezing chamber outlet 288 defined by the inner wall 250. A funnel element 290 is attached to the freezing vessel 228. The funnel element 290 includes an internal passageway 292 that decreases in size from a funnel inlet 294 to a funnel outlet 296 to form a tapered passageway 292. The frozen particles 282 from the freezing chamber outlet 288 enter the funnel inlet 294, are guided downward by the tapered passageway 292 and discharged from the funnel outlet 296.

The system 200 further includes an upper intermediate vessel 298 having an upper intermediate chamber 300, a freeze drying vessel 302 having a freeze drying chamber 304 (see FIG. 4) and a lower intermediate vessel 306 having a lower intermediate chamber 308. The freeze drying vessel 302 is located underneath the upper intermediate vessel 298 and the lower intermediate vessel 306 is located underneath the freeze drying vessel 302. Valves 310 and 312 are connected between the funnel element 290 and the upper intermediate vessel 298 and between the upper intermediate vessel 298 and the freeze drying vessel 302, respectively. Valves 314 and 316 are connected between the freeze drying vessel 302 and the lower intermediate chamber 308 and the lower intermediate chamber 308 and a dry product collection canister 318, respectively. In an embodiment, valves 310, 312, 314 and 316 may be split butterfly valves.

In addition, the system 200 includes a first vacuum pump 320 that is in fluid communication with known first 322 and second 324 condensing units through first 326 and second 328 vacuum lines connected between the first vacuum pump 320 and the first 322 and second 324 condensing units, respectively. A drying chamber vacuum line 330 extending from the drying chamber 304 is connected between first 332 and second 334 condensing vacuum lines extending from the first 322 and second 324 condensing units, respectively. The first 332 and second 334 condensing vacuum lines include valves 336 and 338, respectively. The drying chamber 304 is in fluid communication with the first vacuum pump 320 and the first condensing unit 322 when valve 336 is opened. Alternatively, drying chamber 304 is in fluid communication with the first vacuum pump 320 and second condensing unit 324 when 338 valve is opened. When valve 336 is opened and valves 338, 312, 314 are closed, the drying chamber 304 is evacuated by the first vacuum pump 320 to a first vacuum pressure. Alternatively, the drying chamber 304 is evacuated to the first vacuum pressure when valve 338 is opened and valves 336, 312, 314 are closed. The upper intermediate chamber 300 is in fluid communication with a second vacuum pump 340 through a second vacuum line 342 connected between the upper intermediate chamber 300 and the second vacuum pump 340.

During operation of the system 200, the freezing chamber 244 and the tapered passageway 292 are maintained at approximately atmospheric pressure. Valve 310 is closed during the generation of a batch of frozen particles 282 in the freezing vessel 228. Once the batch is complete, valve 310 is opened thus causing the frozen particles 282 to flow downward by gravity from the funnel outlet 296 through valve 310 and into the upper intermediate chamber 300. Once the frozen particles 282 from the funnel element 290 are transferred into the upper intermediate chamber 300, valve 310 is closed. With valve 312 also closed, the upper intermediate chamber 300 is then evacuated by the second vacuum pump 340 to a vacuum pressure substantially similar to the vacuum pressure in the drying chamber 304 (i.e. the first vacuum pressure). Once the first vacuum pressure is reached, valve 312 is opened to enable the frozen particles 282 to flow downward by gravity from the upper intermediate chamber 300 through valve 312 and into the drying chamber 304. Once the frozen particles 282 from the upper intermediate chamber 300 are transferred into the drying chamber 304, valve 312 is closed. The upper intermediate chamber 300 is then returned to approximately atmospheric pressure in preparation for the next batch of frozen particles 282. The funnel element 290, valve 310, upper intermediate vessel 298 and valve 312 may include at least one cooling element, such as a silicone oil cooling jacket, that cools the funnel element 290, valve 310, upper intermediate vessel 298 and valve 312 to a temperature that inhibits thawing of the frozen particles 282 that come into contact with walls and other surfaces of the funnel element 290, valve 310, upper intermediate vessel 298 and valve 312.

Figure 4:
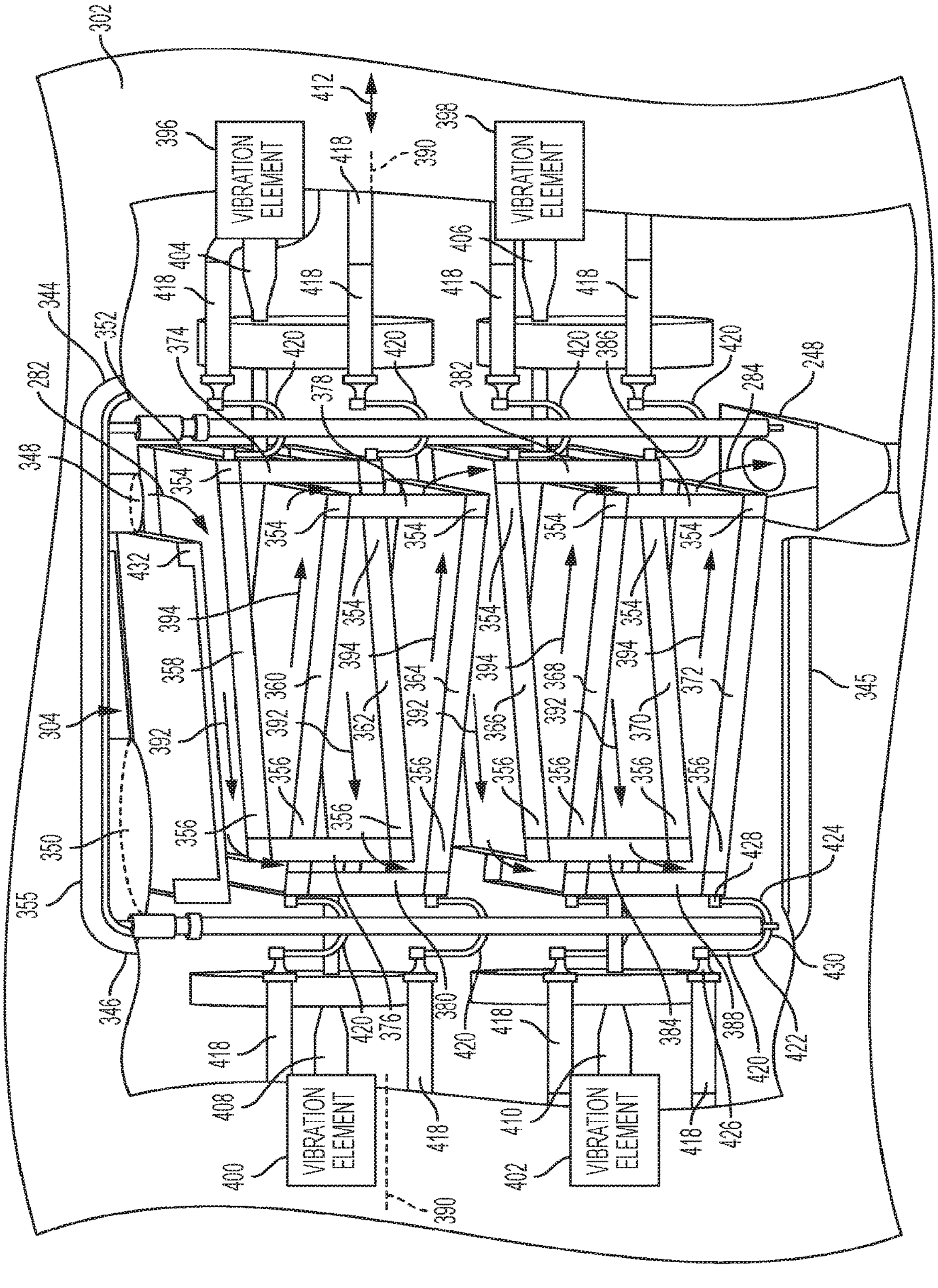
FIG. 4 is an interior view of a freeze drying vessel and drying chamber.

Referring to FIG. 4, an interior view of the freeze drying vessel 302 and drying chamber 304 is shown. The drying chamber 304 includes first 344 and second 346 side walls, a bottom wall 345 and a top wall 355 including a drying chamber inlet 348 that receives the frozen particles 282 from valve 312 as previously described. The drying chamber 304 also includes a vacuum port 350 in the top wall 355 that is in fluid communication with the drying chamber vacuum line 330. During operation of the system 200, the drying chamber 304 is evacuated by the first vacuum pump 320 to the first vacuum pressure via the vacuum port 350. The drying chamber 304 further includes a plurality of sloped shelves 352 that receive the frozen particles 282. The shelves 352 are arranged vertically in the drying chamber 304 to provide top and bottom shelves and a plurality of shelves in between the top and bottom shelves. Each shelf 352 is sloped and includes a first end portion 354 and a second end portion 356 opposite the first end portion 354. As will be described, the shelves 352 heat the frozen particles 282 in order to promote sublimation of the frozen particles 282. In addition, the shelves 352 are simultaneously vibrated in a horizontal direction 412 to cause the frozen particles 282 to displace on the shelf with respect to each other. This continuously rearranges the frozen particles 282 on the shelves 352 to enable substantially even heating of the frozen particles 282 and inhibit product agglomeration. In addition, vibration in the horizontal direction 412 causes the frozen particles 282 to move or advance relative to an associated shelf and drop downward from shelf to shelf due to gravity to ultimately form freeze dried product 284 in powder form that is discharged through a drying chamber outlet 248 located in the bottom wall 345 of the drying chamber 304.

In an embodiment, the drying chamber 304 may include first 358, second 360, third 362, fourth 364, fifth 366, sixth 368, seventh 370 and eighth 372 shelves. It is understood that additional or fewer shelves 352 may be used. At least one connecting member (374, 376, 378, 380, 382, 384, 386, 386, 388) is attached between pairs of shelves. In an embodiment, first 374 and second 376 connecting members are attached between the first 358 and third 362 shelves, third 378 and fourth 380 connecting members are attached between the second 360 and fourth 364 shelves, fifth 382 and sixth 384 connecting members are attached between the fifth 366 and seventh 370 shelves and seventh 386 and eighth 388 connecting members are attached between the sixth 368 and eighth 372 shelves. In an embodiment, the connecting members 374, 376, 378, 380, 382, 384, 386, 388 may be oriented in a substantially vertical direction.

The first end portion 354 of the first shelf 358 is positioned underneath the drying chamber inlet 348 such that the frozen particles 282 from the drying chamber inlet 348 flow downward, or drop, by gravity onto the first end portion 354 of the first shelf 358. The first shelf 358 is oriented relative to a horizontal axis 390 of the freeze drying vessel 302 such that the first end portion 354 of the first shelf 358 is higher than the second end portion 356 to form a downward slope in a first direction 392. The second shelf 360 is located under the first shelf 358 such that the second end portion 356 of the second shelf 360 is higher than first end portion 354 of the second shelf 360 to form a downward slope in a second direction 394 opposite the first direction 392. The third shelf 362 (located under the second shelf 360) and fifth 366 and seventh 370 shelves slope downward in the first direction 392. The fourth 364, sixth 368 and eighth 372 shelves slope downward in the second direction 394 and are located under the third 362, fifth 366 and seventh 370 shelves, respectively. The first 358, second 360, third 362, fourth 364, fifth 366, sixth 368, seventh 370 and eighth 372 shelves are arranged such that the downward slope between successive shelves alternates between the first 392 and second 394 directions. In an embodiment, each shelf 358, 360, 362, 364, 366, 368, 370, 372 may be oriented at an angle approximately 5 degrees relative to the horizontal axis 390. It is understood that other angles may be used. In addition, at least one shelf may have a different angle relative to other shelves.

The second end portion 356 of the second 360, fourth 364, sixth 368 and eighth 372 shelves extends beyond the second end portion 356 of an immediately preceding shelf, i.e. the first 358, third 362, fifth 366 and seventh 370 shelves, respectively, in a substantially horizontal direction 412 such that frozen particles 282 that drop by gravity from the second end portion 356 of the first 358, third 362, fifth 366 and seventh 370 shelves are received by the second end portion 356 of the second 360, fourth 364, sixth 368 and eighth 372 shelves, respectively. In addition, the first end portion 354 of the third 362, fifth 366 and seventh 370 shelves extends beyond the first end portion 354 of an immediately preceding shelf, i.e. the second 360, fourth 364 and sixth 368 shelves, respectively, in a substantially horizontal direction 412 such that the frozen particles 282 that drop by gravity from the first end portion 354 of the second 360, fourth 364 and sixth 368 shelves are received by the first end portion 354 of the third 362, fifth 366 and seventh 370 shelves, respectively.

The first 374, third 382, fourth 380 and eighth 388 connecting members are attached or connected to first 396, second 398, third 400 and fourth 402 vibration elements, respectively, located outside the freeze drying vessel 228 by first 404, second 406, third 408 and fourth 410 drive shafts, respectively, that extend through the first 344 and second 346 side walls. A bellows arrangement may be used to substantially cover each of the drive shafts 404, 406, 408, 410. In accordance with an aspect of the invention, location of the vibration elements 396, 398, 400, 402 outside the freeze drying vessel 228 and the use of a respective bellows arrangement for each drive shaft 404, 406, 408, 410 maintains an aseptic environment within the drying chamber 304. When activated, the first 396, second 398, third 400 and fourth 402 vibration elements cause the first 404, second 406, third 408 and fourth 410 drive shafts, respectively, to vibrate in the horizontal direction 412, which in turn causes the first 358 and third 362, fifth 366 and seventh 370, second 360 and fourth 364, and sixth 368 and eighth 372 shelves, respectively, to vibrate in the horizontal direction 412. In an embodiment, the vibration elements 396, 398, 400, 402 may be known electromagnetic, pneumatic, hydraulic or electronic drives or combinations thereof. Alternatively, a vibration element may be directly attached to each shelf 358, 360, 362, 364, 366, 368, 370, 372. Thus, each shelf of an attached pair of shelves 358 and 362, 360 and 364, 366 and 370, 368 and 372 is sloped in the same direction and shelf pairs 360 and 364, 366 and 370 are respectively above and below a shelf sloped in a different direction. Each shelf of an attached pair 358 and 362, 360 and 364, 366 and 370, 368 and 372 is vibrated together by a single vibration element 396, 398, 400, 402, respectively.

Figure 5:
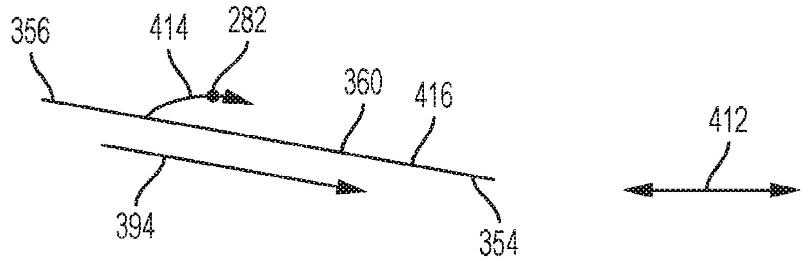
FIG. 5 is an exemplary path of a frozen particle relative to a shelf in the drying chamber.

When the shelves 358, 360, 362, 364, 366, 368, 370, 372 are vibrated horizontally by the vibration elements 396, 398, 400, 402, the downward sloping orientation of each shelf 358, 360, 362, 364, 366, 368, 370, 372 in the first 392 and second 394 directions assists in moving the frozen particles 282 and/or freeze dried product 284 from the first shelf 358 to the eighth shelf 372 in sequential order. Freeze dried product 284 is then deposited from the eighth shelf 372 to the drying chamber outlet 248. Referring to FIG. 5, an exemplary path 414 of a frozen particle 282 relative to the second shelf 360 is shown. Vibration of the second shelf 360 in the horizontal direction 412 causes the frozen particles 282 to be tossed or lifted above a surface 416 of the second shelf 360. The horizontal vibration of the second shelf 360, in combination with the sloped orientation of the second shelf 360, advances the frozen panicle 282 in the second direction 394 relative to the second shelf 360 from the second end portion 356 to the first end portion 354.

Referring back to FIG. 4, movement of the frozen particles 282 from the first shelf 358 to the eighth shelf 372 will now be described. It is understood that the frozen particles 282 may form into freeze dried product 284 before reaching the eighth shelf 372. In accordance with an aspect of the invention, the following description of frozen particle movement is also applicable to the movement of freeze dried product 284. During vibration, the frozen particles 282 move from the first shelf 358 to the eighth shelf 372 in sequential order. In particular, the frozen particles 282 received at the first end portion 354 of the first shelf 358 from the drying chamber inlet 348 advance in the first direction 392 toward the second end portion 356 and subsequently drop by gravity from the second end portion 356 onto the second end portion 356 of the second shelf 360. The frozen particles 282 then advance in the second direction 394 toward the first end portion 354 of the second shelf 360 and subsequently drop by gravity from the first end portion 354 to the first end portion 354 of the third shelf 362.

Movement of the frozen particles 282 with respect to remaining shelves 362, 364, 366, 368, 370 and 372 corresponds to the movement of the first 358 and second 360 shelves. With respect to the third 362 and fourth 364 shelves, the frozen particles 282 advance in the first direction 392 relative to the third shelf 362 toward the second end portion 356, drop by gravity onto the second end portion 356 of fourth shelf 364, advance in the second direction 394 on the fourth shelf 364 toward the first end portion 354, and drop by gravity onto the first end portion 354 of the fifth shelf 366. With respect to the fifth 366 and sixth 368 shelves, the frozen particles 282 advance in the first direction 392 relative to the fifth shelf 366 toward the second end portion 356, drop by gravity onto the second end portion 356 of sixth shelf 368, advance in the second direction 394 on the sixth shelf 368 toward the first end portion 354, and drop by gravity onto the first end portion 354 of the seventh shelf 370. With respect to the seventh 370 and eighth 372 shelves, the frozen particles 282 advance in the first direction 392 relative to the seventh shelf 370 toward the second end portion 356, drop by gravity onto the second end portion 356 of eighth shelf 372, advance in the second direction 394 on the eighth shelf 372 toward the first end portion 354 and drop by gravity onto valve 314.

While the drying chamber 304 is under vacuum as previously described, each shelf 358, 360, 362, 364, 366, 368, 370, 372 is simultaneously heated in order to heat the frozen particles 282 and promote sublimation of the frozen particles 282 as they are vibrated and drop downward from shelf to shelf. In an embodiment, each shelf 358, 360, 362, 364, 366, 368, 370, 372 is connected to a heat transfer fluid source 418 by a flexible hose or conduit 420 that provides fluid communication between an associated heat transfer fluid source 418 and associated shelf 358, 360, 362, 364, 366, 368, 370, 372, in an aspect of the invention, each shelf 358, 360, 362, 364, 366, 368, 370, 372 receives heat transfer fluid from an associated heat transfer fluid source 418 via an associated heat transfer fluid conduit 420. Each conduit 420 may include first 422 and second 424 substantially vertical conduit sections having first 426 and second 428 connection ends attached to an associated heat transfer fluid source 418 and an associated shelf 358, 360, 362, 364, 366, 368, 370, 372, respectively. A curved conduit section 430 is located between the first 422 and second 424 vertical conduit sections to form a substantially U-shaped conduit 420. Each conduit 420 is oriented in line with the direction of vibration of an associated shelf (i.e. the horizontal direction 412) such that the U-shape of each conduit 420 provides additional length for accommodating horizontal displacement of an associated shelf 358, 360, 362, 364, 366, 368, 370, 372 during vibration.

In accordance with an aspect of the invention, the heat transfer fluid received by a respective shelf 358, 360, 362, 364, 366, 368, 370, 372 adds heat such that the temperature of each shelf 358, 360, 362, 364, 366, 368, 370, 372 progressively increases from the first shelf 358 to the eighth shelf 372. For example, the first shelf 358 may be maintained at −40 degrees and the temperature of each successive shelf may increase by 10 degrees C., for example. Thus, the frozen particles 282 are exposed to progressively higher temperatures by each shelf 358, 360, 362, 364, 366, 368, 370, 372 to promote sublimation of the frozen particles 282 as the frozen particles 282 are vibrated and move downward from shelf to shelf. This forms freeze dried product 284 in powder form that ultimately drops by gravity from the first end portion 354 of the eighth shelf 372 toward valve 314. Alternatively, each shelf 358, 360, 362, 364, 366, 368, 370, 372 may be heated by an electric heater, electromagnetic energy source or other known heating element.

As frozen liquid in the product 212 sublimates, vapor is drawn from the drying chamber 304 by the first vacuum pump 320 via the drying chamber vacuum line 330 and is collected in the first condensing unit 322 when valve 336 is opened. Cooled condensing surfaces in the first 322 and second 324 condensing units collect the vapor. In the case of water vapor, the vapor condenses as ice on the condensing surfaces. For example, a condensing surface may include a condensing coil maintained below the condensation temperature of the water vapor. A coolant is passed through the coils 122 to remove heat, causing the water vapor to condense as ice on the coils.

When an ice capacity of the first condensing unit 322 is reached, valve 336 is closed and valve 338 is opened to allow vapor to be collected in the second condensing unit 324. Condensed ice is then simultaneously removed from the first condensing unit 322 so that the first condensing unit 322 may again be utilized to collect vapor when the second condensing unit 324 reaches its ice capacity. When the first condensing unit 322 again reaches its capacity, the previously described process of switching to the second condensing unit 324 to collect vapor, while simultaneously removing ice from the first condensing unit 322, is repeated. In accordance with an aspect of the invention, either the first 322 or second 324 condensing unit may be used to collect vapor while ice is removed from the condensing unit that is not being used (i.e. for example, vapor is collected in the first condensing unit 322 while ice is simultaneously removed from the second condensing unit 324 or the second condensing unit 324 is used to collect vapor while ice is simultaneously removed from the first condensing unit 322) to enable continuous operation of the system 200. In an embodiment, more than two condensing units may be used to collect vapor.

The drying chamber 304 also includes a baffle plate 432 located between the vacuum port 350 and the first shelf 358. The baffle plate 432 may be oriented in an orientation similar to that of the first shelf 358. As previously described, vibration of the shelves causes frozen particles 282 to be tossed or lifted above a surface a respective shelf. The baffle plate 432 serves to inhibit frozen particles 282 from being undesirably drawn into the vacuum port 350 by the first vacuum pump 320. The baffle plate 432 is maintained sufficiently cool by a cooling element, such as a silicon oil cooling jacket, to inhibit thawing of any frozen particles 282 that contact the baffle plate 432. In addition, the baffle plate 432 isolates the frozen particles 282 from warmer areas of the drying chamber 304.

Referring back to FIG. 3, the lower intermediate chamber 308 is in fluid communication with the second vacuum pump 340 through a third vacuum line 434 connected between the lower intermediate chamber 308 and the second vacuum pump 340. When valves 314 and 316 are closed, the lower intermediate chamber 308 is evacuated to the first vacuum pressure by the second vacuum pump 340. Once a batch of freeze dried product 284 is received from the eighth shelf 372 as previously described, valve 314 is opened thus causing the freeze dried product 284 to flow downward by gravity into the lower intermediate chamber 308. Once the batch of freeze dried product 284 is transferred to the lower intermediate chamber 308, valve 314 is closed and the lower intermediate chamber 308 is returned to approximately atmospheric pressure. Valve 316 is then opened to enable discharge of the freeze dried product 284 by gravity into dry product collection canister 318, such as a sterile stainless steel container. The freeze dried product 284 may then be used to fill vessels such as vials, syringes, etc. for shipment. Alternatively, the freeze dried product 284 may be deposited into a hopper feeder that serves as a feeder for directly filling freeze dried product 284 into the vials, syringes etc. without using a collection canister 318. Further, the lower intermediate chamber 308 is evacuated to the first vacuum pressure in preparation for receiving a next batch of freeze dried product 284.

Figure 6A:
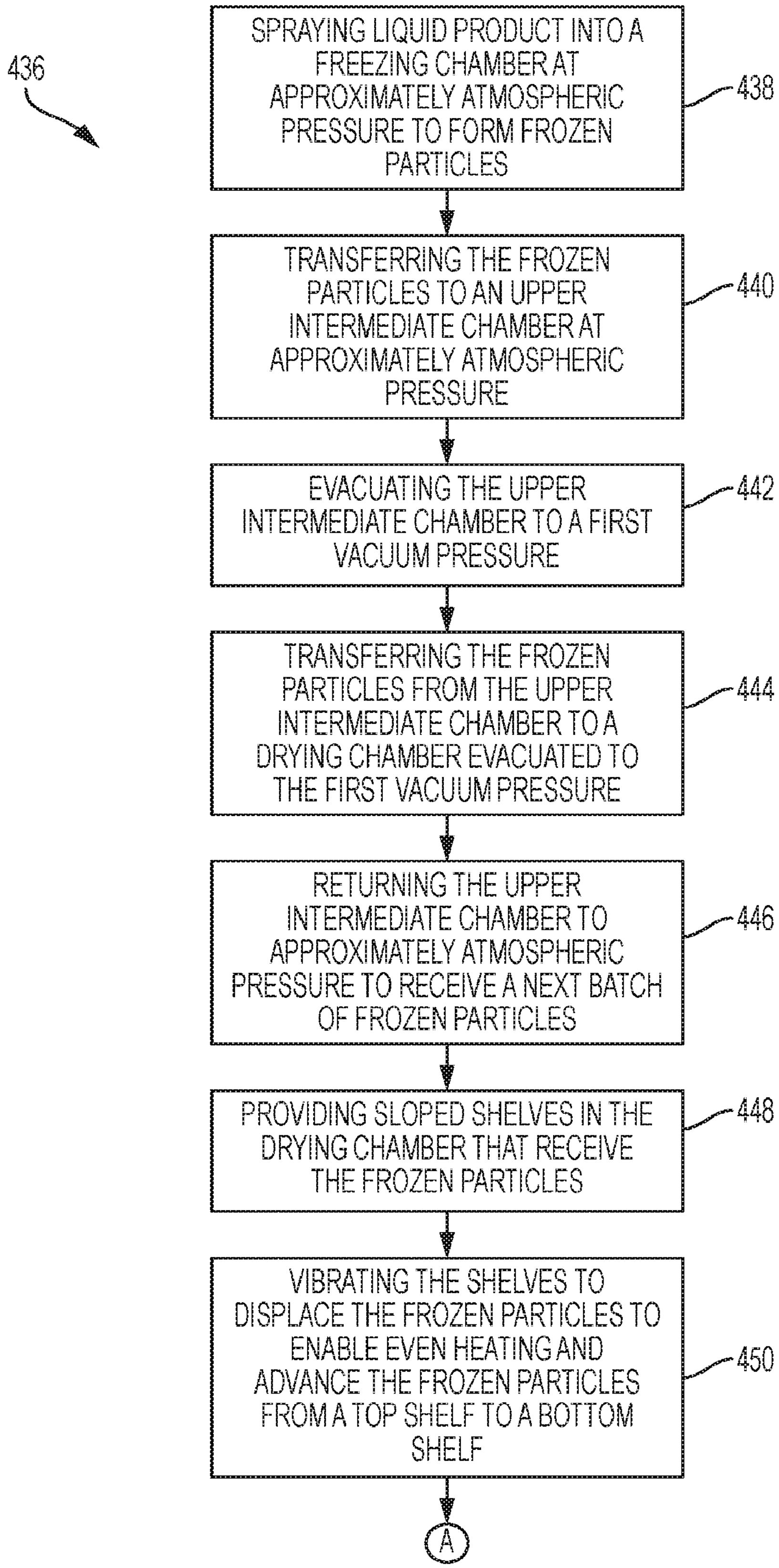
FIGS. 6A and 6B illustrate a method of forming freeze dried product in accordance with an aspect of the invention.
Figure 6B:
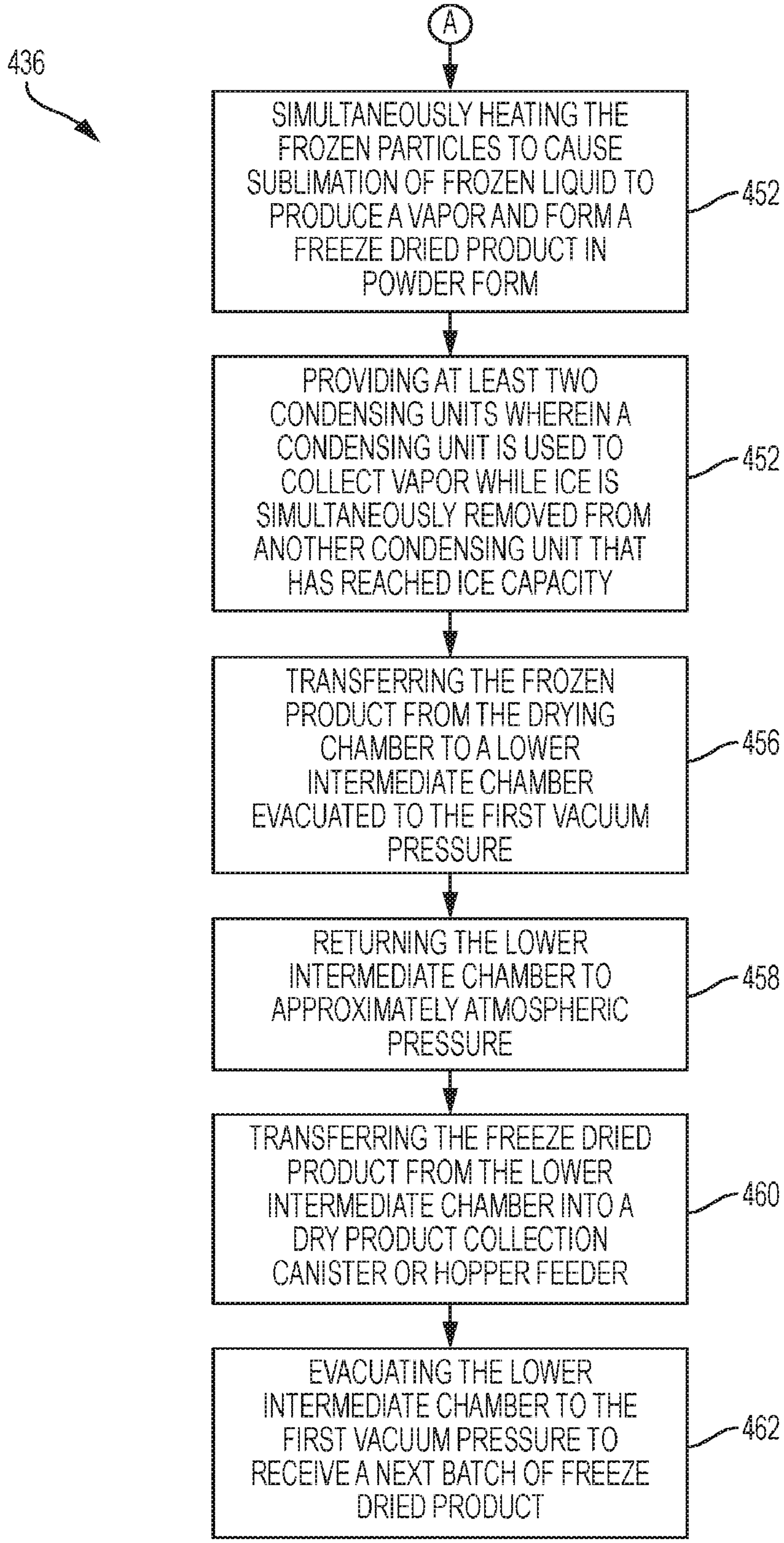

Referring to FIGS. 6A and 69, a method 436 of forming freeze dried product 284 in accordance with an aspect of the invention is shown. At step 438, fluid product 212 is sprayed into a freezing chamber 244 that is at approximately atmospheric pressure to form frozen particles 282. At step 440, the frozen particles 282 are then transferred to an upper intermediate chamber 300 that is at approximately atmospheric pressure. At step 442, the upper intermediate chamber 300 is evacuated to a first vacuum pressure. At step 444, the frozen particles 282 are transferred from the upper intermediate chamber 300 to a drying chamber 304 that is also evacuated to the first vacuum pressure. Once the frozen particles 282 are transferred to the drying chamber 304, the upper intermediate chamber 300 is returned to approximately atmospheric pressure in preparation for receiving a next batch of frozen particles 282 at step 446. The method 436 also includes providing sloping shelves 352 in the drying chamber 304 that receive the frozen particles 282 at step 448. At step 450, the shelves 352 are vibrated to displace the frozen particles 282 so as to enable even heating of the frozen particles 282 and advancement of the frozen particles 282 from a top shelf 358 to a bottom shelf 372. Simultaneous with vibration, the frozen particles 282 are heated to cause sublimation of frozen liquid to produce a vapor and form freeze dried product 284 in powder form at step 452. At step 454, at least two condensing units 322, 324 are provided wherein a condensing unit is used to collect vapor while ice is simultaneously removed from another condensing unit that has reached ice capacity to enable continuous operation of the system 200. The freeze dried product 284 is then transferred from the drying chamber 304 to a lower intermediate chamber 308 evacuated to the first vacuum pressure at step 456. The lower intermediate chamber 308 is returned to approximately atmospheric pressure at step 458. The freeze dried product 284 is then transferred from the lower intermediate chamber 308 into a dry product collection canister or hopper feeder 318 at step 460. At step 462, the lower intermediate chamber 308 is evacuated to the first vacuum pressure in preparation for receiving a next batch of freeze dried product 284.

Thus, the freeze drying system 200 in accordance with aspects of the invention enables a continuous freeze drying process. In addition, the freeze dried product 284 manufactured in accordance with aspects of the invention is manufactured without using tray dryers in which bulk product is manually loaded into trays, freeze dried, and then manually removed from the trays. The freeze dried product 284 manufactured in accordance with aspects of the invention does not require milling to achieve a suitable powder size and uniformity. Further, aspects of the invention provide an improved technique for processing bulk quantities of aseptic materials in a controlled, aseptic environment.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A freezing vessel for a freeze drying system that forms freeze dried product in powder form, comprising:

an inner circumferential wall defining a freezing chamber;

a top wall including at least one nozzle having a nozzle outlet end that sprays fluid product drops that flow downward into the freezing chamber wherein the nozzle is operated at a setpoint nozzle pressure maintained by injecting an adjusting fluid into a product reservoir having a liquid level defined by the fluid product suitable for operating the nozzle wherein a flow rate of the adjusting fluid is adjusted to increase pressure within the product reservoir to provide a backing pressure that compensates for changes in the liquid level that occur during operation of the nozzle;

an outer circumferential wall spaced apart from the inner circumferential wall to form a cavity between the inner and outer walls wherein a lower end of the inner wall defines a freezing chamber outlet;

a cavity outlet that extends from the outer wall;

a cavity inlet that extends from a location on the outer wall that is lower than a location of the cavity outlet, wherein a cooling fluid enters the cavity through the cavity inlet to fill a portion of the cavity between the inner and outer walls and between the cavity inlet and cavity outlet and wherein the cooling fluid flows through the cavity at a first flow rate and is discharged from the cavity through the cavity outlet to form a freezing zone having a freezing zone temperature between the cavity inlet and the cavity outlet wherein the fluid product drops freeze in the freezing zone and form frozen product particles that exit the freezing chamber outlet wherein the cooling fluid is in direct contact with the inner wall as the cooling fluid flows through the cavity to remove heat; and a temperature sensor that detects an outlet temperature of the cooling fluid discharged at the cavity outlet, wherein the outlet temperature is indicative of the freezing zone temperature and wherein the first flow rate of the cooling fluid is adjusted to increase or decrease the freezing zone temperature to obtain a setpoint temperature detected by the temperature sensor to maintain a freezing zone temperature suitable for forming the frozen product particles.

2. The freezing vessel according to claim 1, wherein the nozzle includes a nozzle heating element to heat the nozzle and maintain the nozzle at a suitable operating temperature.

3. The freezing vessel according to claim 1, wherein a height (H) of the freezing zone is selected based upon the freezing temperature of the fluid product being sprayed by the nozzle and a volume of the drops.

4. The freezing vessel according to claim 1, wherein the cavity has a substantially annular shape.

5. A freezing vessel for a freeze drying system that forms freeze dried product in powder form, comprising:

an inner circumferential wall defining a freezing chamber;

a top wall including at least one nozzle having a nozzle outlet end that sprays fluid product drops that flow downward into the freezing chamber wherein the nozzle is operated at a setpoint nozzle pressure maintained by injecting an adjusting fluid into a product reservoir having a liquid level defined by the fluid product suitable for operating the nozzle wherein a flow rate of the adjusting fluid is adjusted to increase pressure within the product reservoir to provide a backing pressure that compensates for changes in the liquid level that occur during operation of the nozzle;

an outer circumferential wall spaced apart from the inner circumferential wall to form a cavity between the inner and outer walls wherein a lower end of the inner wall defines a freezing chamber outlet;

a cavity outlet that extends from the outer wall;

a cavity inlet that extends from a location on the outer wall that is lower than a location of the cavity outlet, wherein a cooling fluid enters the cavity through the cavity inlet to fill a portion of the cavity between the inner and outer walls and between the cavity inlet and cavity outlet and wherein the cooling fluid flows through the cavity at a first flow rate and is discharged from the cavity through the cavity outlet to form a freezing zone having a freezing zone temperature between the cavity inlet and the cavity outlet wherein the fluid product drops freeze in the freezing zone and form frozen product particles that exit the freezing chamber outlet wherein the cooling fluid is in direct contact with the inner wall as the cooling fluid flows through the cavity to remove heat; and a temperature sensor that detects an outlet temperature of the cooling fluid discharged at the cavity outlet, wherein the outlet temperature is indicative of the freezing zone temperature and wherein the first flow rate of the cooling fluid is adjusted to increase or decrease the freezing zone temperature to obtain a setpoint temperature detected by the temperature sensor to maintain a freezing zone temperature suitable for forming the frozen product particles wherein increasing the first flow rate of the cooling fluid removes additional heat from the freezing zone to lower the freezing zone temperature and decreasing the first flow rate of the cooling fluid removes less heat from the freezing zone to increase the freezing zone temperature.

6. The freezing vessel according to claim 5, wherein the nozzle includes a nozzle heating element to heat the nozzle and maintain the nozzle at a suitable operating temperature.

7. The freezing vessel according to claim 5, wherein a height (H) of the freezing zone is selected based upon the freezing temperature of the fluid product being sprayed by the nozzle and a volume of the drops.

8. The freezing vessel according to claim 5, wherein the cavity has a substantially annular shape.

9. A method of forming frozen product particles used to form freeze dried product, comprising:

providing an inner circumferential wall defining a freezing chamber;

providing a top wall including at least one nozzle having a nozzle outlet end that sprays fluid product drops that flow downward into the freezing chamber;

operating the nozzle at a setpoint nozzle pressure maintained by injecting an adjusting fluid into a product reservoir having a liquid level defined by the fluid product suitable for operating the nozzle wherein a flow rate of the adjusting fluid is adjusted to increase pressure within the product reservoir to provide a backing pressure that compensates for changes in the liquid level that occur during operation of the nozzle;

providing an outer circumferential wall spaced apart from the inner circumferential wall wherein a lower end of the inner wall defines a freezing chamber outlet;

providing a cavity between the inner and outer walls;

providing a cavity outlet that extends from the outer wall;

providing a cavity inlet that extends from a location on the outer wall that is lower than a location of the cavity outlet, wherein the cavity inlet is in fluid communication with the cavity;

supplying a cooling fluid that enters the cavity through the cavity inlet to fill a portion of the cavity between the inner and outer walls and between the cavity inlet and cavity outlet and wherein the cooling fluid flows through the cavity at a first flow rate and is discharged from the cavity through the cavity outlet to form a freezing zone having a freezing zone temperature between the cavity inlet and the cavity outlet wherein the fluid product drops freeze in the freezing zone and form frozen product particles that exit the freezing chamber outlet wherein the cooling fluid is in direct contact with the inner wall as the cooling fluid flows through the cavity to remove heat;

providing a temperature sensor that detects an outlet temperature of the cooling fluid discharged at the cavity outlet, wherein the outlet temperature is indicative of the freezing zone temperature; and adjusting the first flow rate of the cooling fluid to increase or decrease the freezing zone temperature to obtain a setpoint temperature detected by the temperature sensor to maintain a freezing zone temperature suitable for forming the frozen product particles.

10. The method according to claim 9, further providing a nozzle heating element for the nozzle to heat the nozzle and maintain the nozzle at a suitable operating temperature.

11. The method according to claim 9, wherein the cavity has a substantially annular shape.

12. The freezing vessel according to claim 1, wherein the cooling fluid entering through the cavity inlet is in a liquid state.

13. The freezing vessel according to claim 12, wherein the cooling fluid discharged through the cavity outlet includes two phase flow having a gaseous state portion and a liquid state portion after heat is absorbed by the cooling fluid flowing through the cavity.

* * * * *